Oct. 11, 1932.        R. L. LAUER        1,882,021
CONDUIT CONNECTER
Filed Jan. 29, 1931
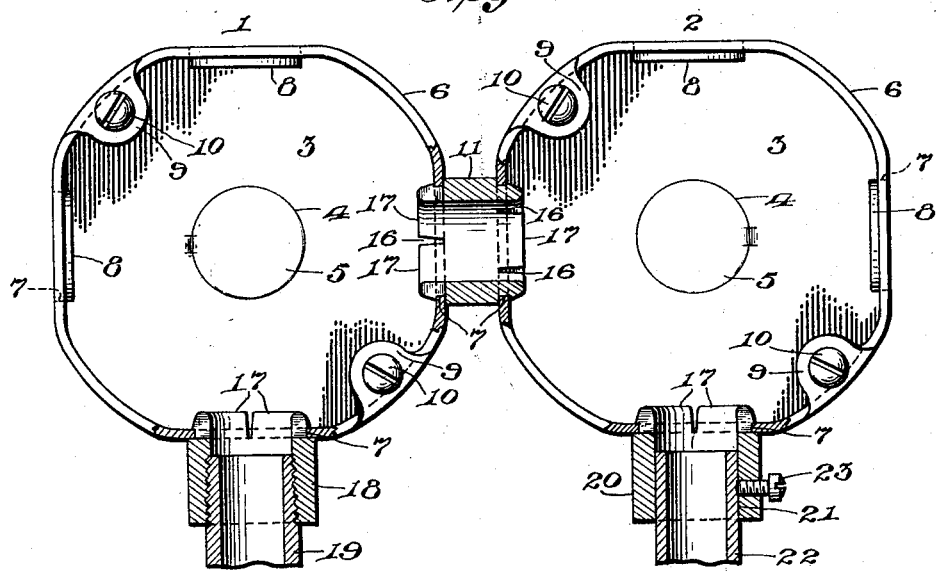
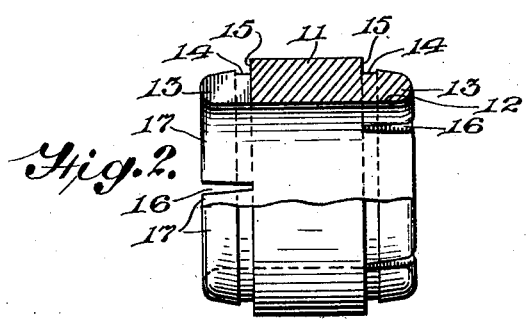
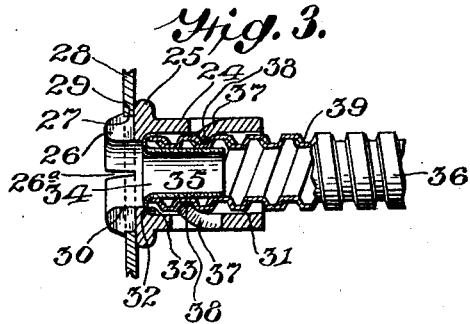
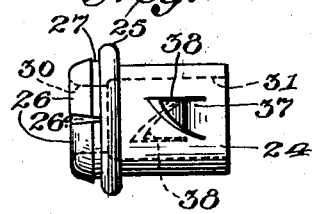
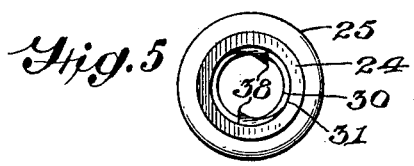
Inventor
Rudolph L. Lauer,
By J. Stuart Freeman.
Attorney Patented Oct. 11, 1932

1,882,021

UNITED STATES PATENT OFFICE

RUDOLPH L. LAUER, OF PHILADELPHIA, PENNSYLVANIA

CONDUIT CONNECTER

Application filed January 29, 1931. Serial No. 512,071.

The object of the invention is to provide improvements in conduit connecters, such as are used in electric wiring installations, but are equally well adapted for many other uses.

More specifically another object is to provide a connecter which is adapted for use in operatively connecting together such elements as two or more junction boxes, a junction box and a pipe, a junction box and a flexible tube, or sheathing for wires or hose, and similar combinations.

Heretofore, when operatively joining a pair of junction boxes together, a fixture has usually been employed consisting of a threaded nipple and four nuts upon said nipple to engage the opposite sides of the walls of the respective boxes. The present device accomplishes the same result by the use of only one piece, a short tube or nipple, the opposite ends of which are slightly contractible upon entering the wall apertures of the usual junction, switch and outlet boxes, and thereafter are adapted to expand into locking engagement with the edge portions of the walls surrounding such apertures.

A further object, still more specifically, is to provide the tapered end portion of a connecter with spaced longitudinal cuts, to provide tapering resilient fingers, the larger part of said fingers being provided with a circumferential groove of a depth which depends upon the resiliency of the fingers, the opposite end of said connecter being provided with either the same or different form of means for attachment to another element, such as the pipe, tube, sheathing, or hose, as above referred to.

Still another object is to provide one form of connecter with resilient prongs, which are adapted to automatically engage and prevent the withdrawal of a tube, sheathing, or hose, after the same has been inserted into such connecter, said teeth if desired being more abrupt in one direction than another to prevent withdrawal of the tube, etc., by rotation.

With these and other objects in mind, the present invention comprises further details of construction and operation, which are fully brought out in the following description when read in conjunction with the accompanying drawing, in which Fig. 1 is a partially sectional plan view of a pair of junction boxes connected together, and to which are connected other elements, by means of connecters embodying the improved construction; Fig. 2 is a part elevational, part sectional view of the connecter shown in the center of Fig. 1; Fig. 3 is a transverse sectional view of a connecter for uniting a flexible sheathing with a junction box or the like, a fragmentary portion of a piece of such sheathing or hose being shown partly in section and partly in elevation; Fig. 4 is an elevational view of the connecter of Fig. 3 per se; and Fig. 5 is an end elevation of the same.

Referring to Figs. 1 and 2 of the drawing, two junction boxes 1 and 2 are shown as comprising in each case a rear wall 3 provided with an aperture 4 closed by a so-called knock-out 5, and a circumferential wall 6 provided with a plurality of apertures 7, which are originally closed by knock-outs 8, but from which in the case of two such apertures the corresponding knock-outs have been removed, leaving the apertures clear of obstruction. The walls 6 may also be provided with any suitable means such as the inturned lugs 9, provided with adjustable screws 10, for securing cover plates (not shown) to said boxes. These junction boxes represent many types of hollow members such as are used in electric wiring and similar installations, and represent also outlet boxes, switch boxes, and the like. Any one or more of the apertures of the boxes may be opened by removing therefrom the corresponding one or more knock-outs in the usual manner.

One embodiment of the present invention comprises a relatively short section of tubing forming a nipple 11, having a bore 12 and reduced end portions 13. These end portions are tapered upon their outer surfaces and rounded upon their extremities to prevent abrasion of insulated wires and the like when being drawn through said bore. Said nipple is also provided with circumferential grooves 14 which surround the larger portions of said tapered end portions and are bounded upon adjacent sides by relatively abrupt shoulders 15, said tapered portions being provided with preferably longitudinally extending circumferentially spaced severances 16 which may be sawed, cast, or otherwise produced in order to provide independent spaced radially yielding fingers 17. It will be noticed that the grooves 14 from their position as described cross the base portions of these fingers.

In the operation of this form of connecter, one end portion is inserted into one of the apertures 7 and by means of a blow of a hammer or the like upon the other end of said nipple, the latter is driven into said aperture, the leading fingers at first contracting and then suddenly expanding as the edge surrounding the aperture enters the adjacent groove 14 and is prevented from further progress by the abruptness of the neighboring shoulder 15. The second junction box or similar hollow member may thereupon be placed upon the opposite end of said nipple as shown in Fig. 1 and attached thereto by striking the opposite end of either box with a suitable tool in order to force the free end of the nipple into the second member, as hereinbefore described and as shown in the drawing.

Referring to the lower portion of Fig. 1, on the left hand side is shown a connecter comprising the fingers 17, as hereinbefore described, in cooperation with an aperture leading into the junction box 1, while, however, the opposite end of said connecter comprises an internally threaded tube 18 into which may be removably secured the similarly threaded end portion of a second tube, pipe, or the like 19, through which wires or the like may be drawn. Upon the opposite or right hand side of Fig. 1 and leading through an aperture in the junction box 2 is a slightly modified form of connecter, which in addition to the fingers 17 comprises a downwardly extending tube 20, having a smooth bore 21, adapted to receive a tube, pipe, or the like 22, the latter being removably held in operative position in this instance by actuation of the set screw 23, or otherwise as may be desired.

Referring now to Figs. 3, 4 and 5, a modified form of connecter is shown as comprising a tubular member 24, having a peripheral flange 25, upon one side of which are radially yielding circumferentially spaced resilient fingers 26, spaced apart by severances 26ª and crossed upon their outer surface by a circumferential groove 27, in which is positioned the side wall 28 of a junction, switch or outlet box through which extends an aperture 29. The bore 30 of this connecter within the fingers 26 merges abruptly into an enlarged bore 31 within the tube 24 to form an annular shoulder 32, against which is adapted to be positioned the flanged end portion 33 of a fibre bushing or the like 34, a tubular body portion 35 of which extends into a spirally formed flexible conduit 36, the flange 33 of said bushing protecting the inner end of said conduit as the latter abuts indirectly against the shoulder 32. The opposite sides of the tubular wall 24 are preferably provided with staggered inwardly bent prongs 37, which terminate in pointed end portions 38, preferably more abrupt in one direction than in the other, in order not only to positively engage within the spiral groove 39 of the flexible conduit, as shown in Fig. 3, but to also prevent separation of said conduit from said connecter by rotating one relatively with respect to the other. Obviously these prongs may be made of any desired shape, and so the shape of the prong illustrated is intended to merely represent one of many forms which are suitable for the purpose in mind.

In the operation of this form of the device, the fingers 26 are inserted through the aperture 29 and the opposite end of the connecter is struck in order to drive said fingers into binding relation with the junction or other box wall, after which the end portion of a flexible conduit of indefinite length has inserted into it the bushing 35, following which said conduit is in turn forced into the tubular portion 24 of said connecter, the prongs 37 temporarily yielding outwardly in order to pass over the spiral ridges of said conduit and thereafter moving resiliently into spaced portions of the groove 39 to prevent the removal of said conduit from said connecter as described.

Having thus described my invention, what I claim and desire to protect by Letters Patent of the United States is:

1. In combination, an outlet box or the like having an aperture, a connecter having a tapered end portion insertible through said aperture and provided with circumferentially spaced longitudinally extending severances providing interposed inherently expansible fingers, said fingers having an external circumferential groove about the same in spaced relation to the free ends thereof and having shoulders defining the sides of the groove, said groove and shoulders being rigidly engageable with the portion of the box surrounding said aperture through the expansive action of said fingers following contraction by passage through the aperture, the connecter thus being attachable solely of itself and automatically through its application in said aperture.

2. A connecter for attachment to an outlet box or the like comprising a tubular body having a tapered end portion provided with circumferentially spaced longitudinally extending severances providing interposed inherently expansible fingers, said fingers having an external circumferential groove about the same in spaced relation to the free ends thereof and having shoulders defining the sides of the groove, said shoulders being spaced apart a distance similar to the thickness of the portion of the box engageable thereby, whereby the connecter is rigidly attachable to a box solely of itself and automatically through its movement of application.

In testimony whereof I have affixed my signature.

RUDOLPH L. LAUER.